United States Patent
Lin et al.

(10) Patent No.: US 7,623,421 B2
(45) Date of Patent: Nov. 24, 2009

(54) DATA SEARCH SYSTEM FOR SEARCHING A DATA SYNC PATTERN IN OPTICAL DISC AND METHOD THEREOF

(75) Inventors: Yu-hsuan Lin, Taichung (TW); Jin-bin Yang, Changhua County (TW); Ching-ning Chiu, Hsin-Chu Hsien (TW)

(73) Assignee: MEDIATEK Inc., Hsin-Chu (TW)

( * ) Notice: Subject to any disclaimer, the term of this patent is extended or adjusted under 35 U.S.C. 154(b) by 533 days.

(21) Appl. No.: 11/554,474

(22) Filed: Oct. 30, 2006

(65) Prior Publication Data
US 2007/0140082 A1   Jun. 21, 2007

Related U.S. Application Data

(60) Provisional application No. 60/751,941, filed on Dec. 20, 2005.

(51) Int. Cl.
*G11B 7/00* (2006.01)

(52) U.S. Cl. .................................. 369/47.1; 369/47.27

(58) Field of Classification Search ............... 369/47.1, 369/47.27, 47.28, 57.15, 47.19, 47.2, 47.15, 369/47.22, 47.48
See application file for complete search history.

(56) References Cited

U.S. PATENT DOCUMENTS

| 5,864,531 | A | 1/1999 | Horigome | |
|---|---|---|---|---|
| 7,221,633 | B2 * | 5/2007 | Yamaguchi et al. | 369/53.22 |

\* cited by examiner

*Primary Examiner*—Nabil Z Hindi

(57) ABSTRACT

Disclosed is a data search system for searching the data sync pattern by using a physical address or by detecting the falling edge of the blank area end. The data search system comprises a first data start indicator, a second data start indicator, a decision circuit, a window generator and a data sync pattern search circuit. The first data start indicator generates a first start search signal indicating a first start position. The second data start indicator generates a second start search signal indicating a second start position. The decision circuit selects to output one of the start search signals. The window generator generates a window interval starting from the start position. The data sync pattern search circuit searches a data sync pattern of the data in the window interval to determine the data following the data sync pattern.

39 Claims, 9 Drawing Sheets

DATA SEARCH SYSTEM FOR SEARCHING A DATA SYNC PATTERN IN OPTICAL DISC AND METHOD THEREOF

CROSS REFERENCE TO RELATED APPLICATION

This application claims the benefit of U.S. Provisional Patent Application Ser. No. 60/751,941, filed Dec. 20, 2005.

FIELD OF THE INVENTION

The present invention generally relates to a data search system for searching a data sync pattern in an optical disc and method thereof, and more particularly to a data search system for searching data sync pattern in a non-consecutive data in an optical disc and method thereof.

BACKGROUND OF THE INVENTION

According to the standard of optical disc, the unit of the recording data in an optical disc is a Recording Unit Block (RUB). The disc basically includes a Run-in area, a cluster area (for recording data), a Run-out area and a Guard3 area in sequent order. The Run-in and Run-out areas are specific areas allowing the optical disc drive to synchronize data. The cluster area is for recording the user data. The Guard3 area is employed to prevent unrecorded area occurring between two RUBs in a consecutive recording manner. A consecutive data means data, which is consecutively recorded without blank area existing therein. Contrary to the consecutive data, a non-consecutive data means record data with blank area therein, before or after.

Moreover, a data sync pattern exists in the head of the cluster area and after the Run-in area. The data sync pattern is a specific data pattern prior to a cluster area for the optical disc drive to start the decoding of reading, searching the cluster area data or information in an optical disc.

The HD-DVD specifications use similar definitions for the physical structures as Blu-ray Disc. A VFO field is similar to the Run-in area; a data field is similar to the cluster area; a buffer is similar to the Run-out area; a Guard field is similar to the Guard 3 area, respectively. Similarly, the data sync pattern, a specific data pattern also in the head of the data field for the optical disc drive to start the decoding of reading, searching the data or information in the HD-DVD specifications.

Previously, the optical disc drive can obtain the current position indicated by a pickup head from the RUBs such as CD, DVD, but the content of the RUBs may be variable and sometimes even unpredictable track defects of the optical disc will influence the decoding result from the user data. Therefore, the data sync pattern search method according to the prior art, always searches the data sync pattern in the RUBs from the very beginning of the tracks will result to a high fail rate in the search for the data sync pattern.

Furthermore, discs such as CD-RW or other discs are developed earlier, and if a user is going to write (record) data into the optical disc, the only way of writing data is from the very beginning of the Land or Groove tracks in the optical disc in consecutive manner. The intermittent recording or the recording at arbitrary sector of the Land or Groove tracks in the optical disc will never be allowed. Therefore, searching the data sync pattern to determine the cluster area is also performed from the very beginning as a default setting according to prior arts and is to prevent a mis-recognizing the data sync pattern. However, as the AV (audio and video) optical storage media technology progresses to rewritable digital versatile disc in the present day, the mode of recording data is more arbitrary as according to users' demand. Therefore, optical disc intermittent recording or recording at arbitrary sector of the Land or Groove tracks is now available as one option in Blu-Ray or HD-DVD disc. For example, a user can record one minute of music (or any other digital data) by starting from the track near the periphery of the optical disc; there's no need to start recording data from the very beginning of the tracks. Further, when an optical disc has defects on specified tracks, it will be a great benefit for the user to write the data into the good tracks of the optical disc as desired.

However, such intermittent recording or recording at arbitrary tracks in the optical disc may cause problems of failing to search data sync pattern thereby resulting in mis-decoding the cluster area of the data and causing an unstable status of the whole optical disc drive. In a non-consecutively recorded data, a blank area exists prior to the Run-in area and the cluster area of the data, but the data sync pattern searching method according to the prior arts always searches the data sync pattern in the RUBs from the very beginning of the tracks. However, the data sync pattern searching method according to the prior arts can not recognize the blank area well, meanwhile, searching from the very beginning of the track may increase the mis-recognizing rate if the data of intermittent recording or the data of recording at arbitrary tracks some patterns similar to the data sync pattern. The patterns similar to the data sync pattern existing in the tracks may be mis-recognized by the optical disc drive and causes the optical disc drive to fail in searching the data sync pattern. This mis-decoding occurrence causes the optical disc drive to get trapped in a dead loop as the data sync pattern is never to be located in this manner. Therefore, the blank area may cause the optical disc drive to fail in searching the data sync pattern and the following mis-decoding with high rate Consequentially, there is a need to develop a data search system for searching in a non-consecutive data in an optical disc and method thereof.

SUMMARY OF THE INVENTION

To solve the foregoing drawbacks in the prior art, it is an objective of the present invention to provide a data search system for searching a data sync pattern in an optical disc by using a physical address to obtain a low failure rate of searching the data sync pattern in a non-consecutively recorded data or even in a consecutively recorded data more quickly and correctly.

Another objective of the present invention is to provide a data search system for detecting a blank area prior to the data in an optical disc by a blank detector to obtain a low failure rate of searching the data sync pattern in a non-consecutively recorded data or even in a consecutively recorded data more quickly and correctly.

To accomplish the above objectives, the present invention provides a data search system for searching the data sync pattern in an optical disc. The data search system comprises a first data start indicator, a blank detector, a second data start indicator, a decision circuit and a data sync pattern search circuit. The first data start indicator, as a start position predictor, predicts a beginning of the data to generate a first start search signal indicating a first start position of the data in the optical disc by counting a predetermined number of sectors to predict a beginning of data; the blank detector detects a blank area end of the optical disc to generate a blank signal; the second data start indicator generates a second start search signal according to the blank signal; the decision circuit outputs a selected start search signal from the first start search signal and the second start search signal; the data sync pattern search circuit searches a data sync pattern of the data from the selected start position corresponding to the selected start search signal.

The data search system further comprises a window generator. The window generator generates a window interval starting from the start position for the data sync pattern search circuit to search the data sync pattern therein. The window generator further receives a window sizing signal for adjusting a size of the window interval according to the window sizing signal.

Since many conditions for selecting a start search signal are all possible, there can be several predetermined settings for selecting the start search signal as described below. The selected start search signal can be the second start search signal if only a physical address signal can be read from the optical disc or if the blank detector detects a blank area of the optical disc as a default setting.

In a further case, the selected start search signal can be the second start search signal when the data sync pattern search circuit searches the data sync pattern of the optical disc for the first time as default setting and then, the first start search signal since a first searching of the data sync pattern search circuit for the data sync pattern of the optical disc.

The present invention also provides a method for searching the data sync pattern. The method comprises the steps below:

counting a predetermined number of sectors to predict a beginning of data and detecting a blank area end of the optical disc to generate a blank signal;

generating a first start search signal indicating a first start position of the optical disc by predicting the beginning of the data, generating a second start search signal according to the blank signal;

outputting a selected start search signal selected from the first start search signal and the second start search signal; and searching a data sync pattern of the data from the start position corresponding to the selected start search signal to determine the data following the data sync pattern.

By detecting the blank area prior to the data to generate the blank signal, the second start search signal can be obtained accordingly. When a blank area exists (a non-consecutive data), the decision circuit can output the second start search signal from the second data start indicator. When the data is consecutively recorded, the switch circuit can output the first start search signal from the first data start indicator. The present invention provides a data search system capable of searching a non-consecutive data in the optical disc more quickly and correctly. Furthermore, with an adjustable window interval and an adjustable start search position for the window interval, obtaining a low failure rate for searching the data sync pattern in a non-consecutively recorded data, and even searching in a consecutively recorded data more quickly and correctly can be realized.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

First, each RUB is mapped to a Sync 3 area, a reference area and a 1st data area, which are the specific areas of physical address. A physical address decoder, which decodes physical address existing in the optical disc or a blank detector, which is capable of detecting a blank area end of the optical disc drive can contribute solve the aforementioned problems. As general understanding, the track of the optical disc is a spiral construction. Strictly speaking, the track is not spiraling but vibrate in a sin wave along with the spiral. The feature of the track vibrating in a sin wave is referred to as "wobble", which already exists in the optical disc. The information obtained from the wobble of an optical disc is the physical address (wobble address). The address information can also be obtained from the data of an optical disc. Moreover, detecting the falling edge of the blank area end with the blank detector can also provide precise information for the optical disc drive to predict a coming Run-in area and a data sync pattern. Therefore, a data search system for searching the data sync pattern by using the physical address decoder or the blank detector according to the present invention is proposed to solve the problems of high failure rate of searching the data sync pattern for a non-consecutively recorded data or even for a consecutively recorded data.

Figure 1A:
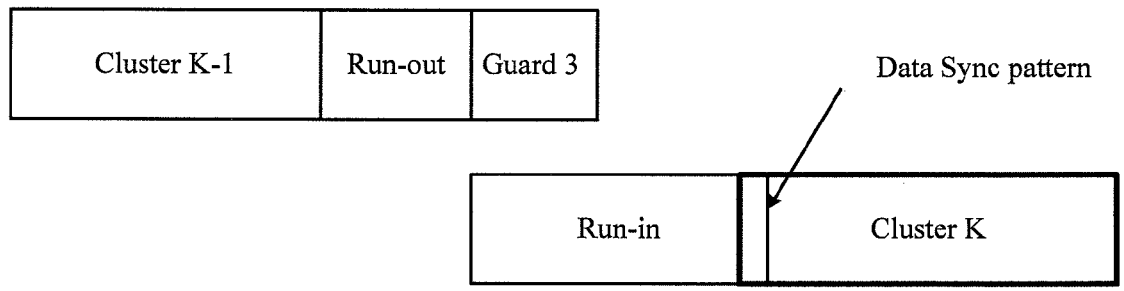
FIG. 1A is an illustration showing the current and preceding clusters of a consecutively recorded data in a Blu-Ray R/RW optical disc.

Please refer to FIG. 1A, an illustration showing the current and preceding clusters of a consecutively recorded data in a Blu-Ray R/RW optical disc.

The Blu-Ray R/RW optical disc track comprises a Run-in area, a Run-out area, a Guard 3 area, a cluster K-1 area (preceding cluster) and a data sync pattern in the head of a cluster K area, and the cluster K area (current cluster) of the consecutively recorded data. The Sync 3 area, reference area, 1st data area, cluster K-1 area, Run-out area, a Guard 3 area, Run-in area, data sync pattern, and the cluster K area are all defined according to the specification of Blu-Ray R/RW optical disc. The cluster K-1 area and the cluster K area are the areas for recording the user data. Each RUB includes a Run-in area, a cluster area, a Run-out area and a Guard 3 area. As shown in FIG. 1A, the Guard 3 area of the cluster K-1 area (preceding data) overlaps the Run-in area prior to the cluster K area to prevent unrecorded area occurring between two RUBs in a consecutively recorded data.

Figure 1B:
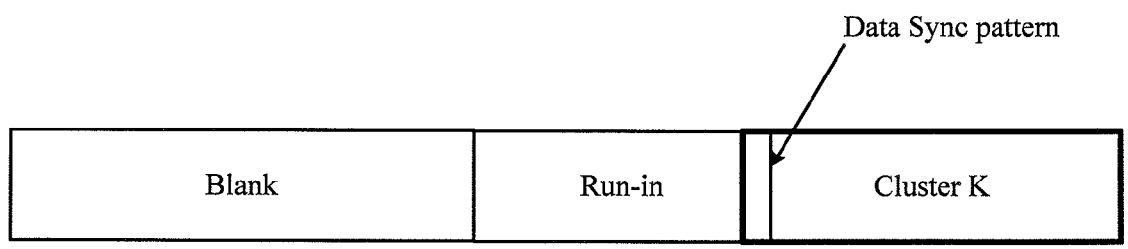
FIG. 1B is an illustration showing a current cluster and a blank of a non-consecutively recorded data in a Blu-Ray R/RW optical disc.

Please refer to FIG. 1B, an illustration showing a current cluster area and a blank area of a non-consecutively recorded data in a Blu-Ray R/RW optical disc. Some Similarities as shown in FIG. 1A, the Blu-Ray R/RW optical disc track comprises a Run-in area, a blank area, a data sync pattern in the head of a cluster K area, and the cluster K area of the non-consecutively recorded data. It shows that the recording to the optical disc is starting from the Run-in area. Therefore, there is a blank area prior to the Run-in area.

Figure 1C:
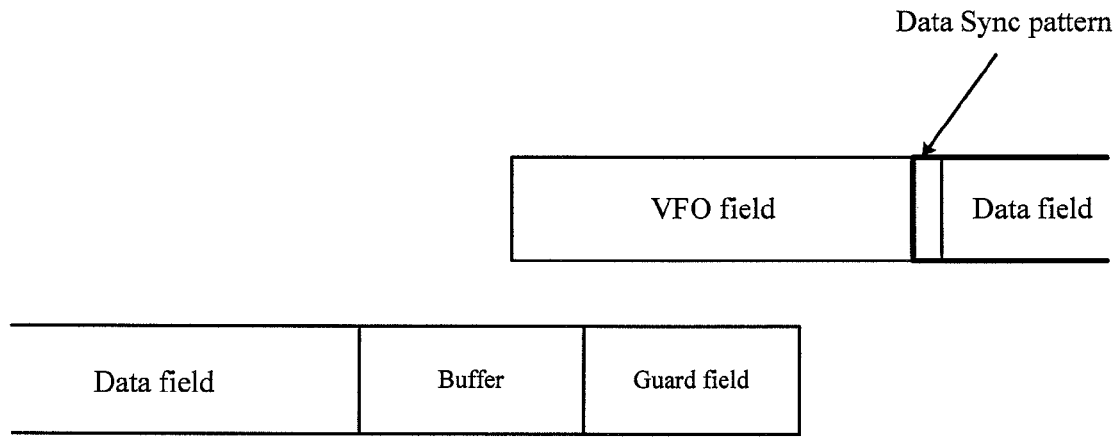
FIG. 1C is an illustration showing a VFO field, a data sync pattern in the head of the data field, the data field, a buffer and a Guard field of a consecutively recorded data in a HD-DVD specification optical disc.

Please refer to FIG. 1C, an illustration showing a VFO field, a data sync pattern in the head of a data field, the data field, a buffer and a Guard field of a consecutively recorded data in a HD-DVD specification optical disc. Although, the HD-DVD specification is not the same as the specification of the Blu-Ray R/RW optical disc, but these specifications use similar definitions for the physical structures. The VFO field is similar to the Run-in area as shown in FIGS. 1A and 1B. The data sync pattern is similar to the data sync pattern of the Blu-Ray R/RW optical disc. The data field corresponds to the cluster K or cluster K-1 area used for recording the user data. Therefore, the data search system according to the present invention can be applied to either the Blu-Ray R/RW optical disc or the HD-DVD optical disc.

Figure 2:
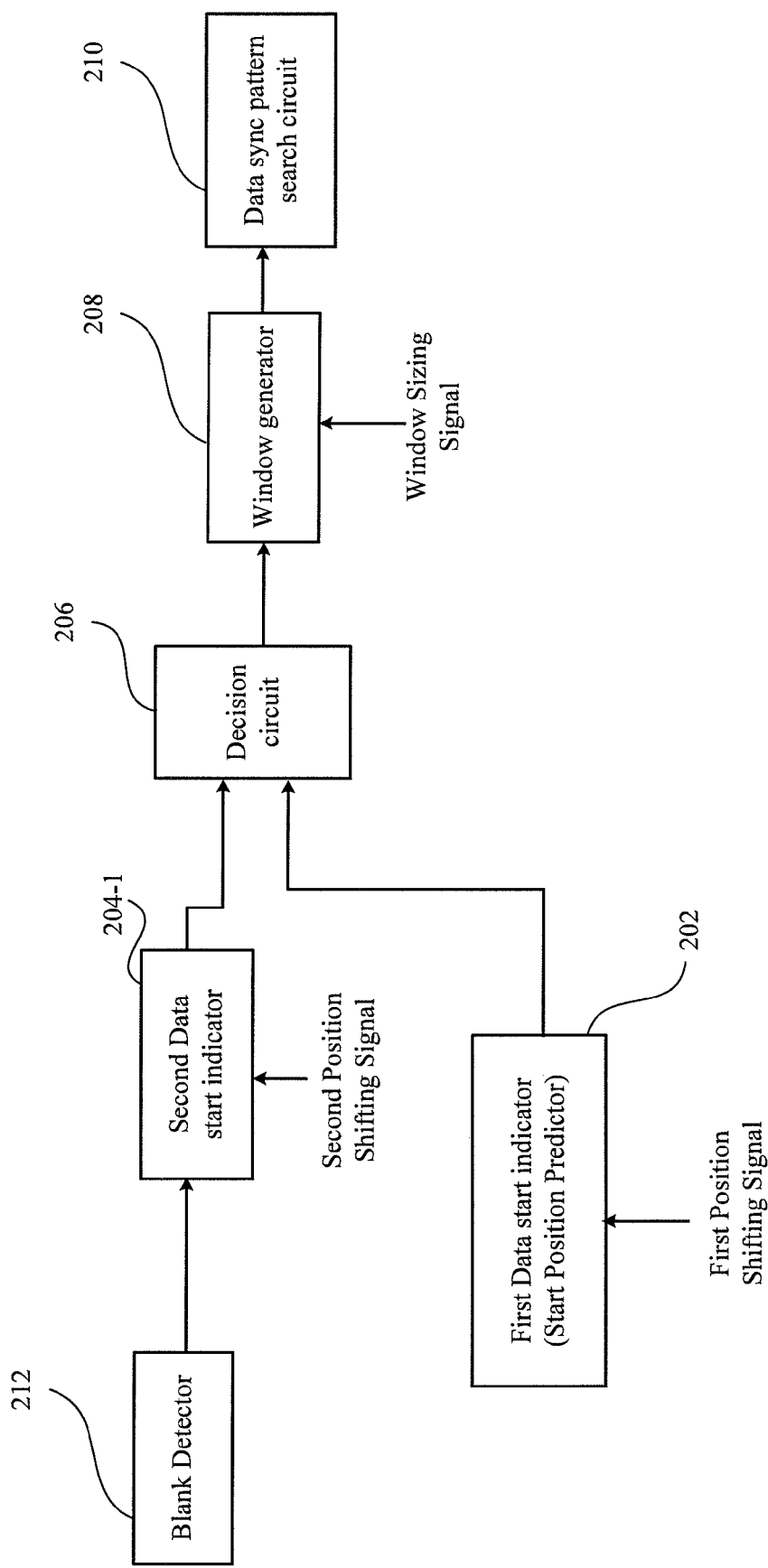
FIG. 2 illustrates a functional block diagram of a data search system for searching the data sync pattern, which starts searching by using a blank detector and selectively outputs first or second start search signal according to first embodiment of the present invention.

Please refer to FIG. 2 in conjunction with FIG. 1A to FIG. 1C, which illustrates a functional block diagram of a data search system for searching the data sync pattern, which starts searching by using a blank detector and selectively outputs first or second start search signals according to first embodiment of the present invention. In the first embodiment, the data search system comprises a first data start indicator (or referred to as a "start position predictor") 202, a second data start indicator 204-1, a decision circuit 206, a window generator 208, a data sync pattern search circuit 210 and a blank detector 212.

If the data is consecutive as shown in FIG. 1A, the first data start indicator 202 predicts the beginning of the data to generate a first start search signal indicating a first start position. If the data is non-consecutive as shown in FIG. 1B or FIG. 1C, the blank detector 212 detects the blank area end to generate a blank signal. The second data start indicator 204-1 generates a second start search signal indicating a second start position according to the blank signal. The decision circuit 206 outputs a selected start search signal selected from the first start search signal and the second start search signal.

Specifically, there will be more detail considerations about how to select the start search signal of the decision circuit 206 but not only about that the data is consecutive or not. Since many conditions for the selected start search signal are all possible, there can be several predetermined settings about how to select the start search signal, details later. The start search signal can be the second start search signal when the blank detector detects a blank area of the optical disc. The selected start search signal may also be the second start search signal when the data sync pattern search circuit searches the data sync pattern of the optical disc for the first time as a default setting.

Alternatively, The selected start search signal can be the first start search signal from a second searching of the data sync pattern search circuit for the data sync pattern of the optical disc as another setting. Moreover, the selected start search signal also can be the first start search signal after reaching predetermined times of searching for the data sync pattern of the optical disc in a different case. The window generator 208 generates a window interval starting from the start position corresponding to the selected start search signal. The data sync pattern search circuit 210 searches a data sync pattern of the data in the window interval to determine the data following the data sync pattern.

The first data start indicator 202 may receive a first position shifting signal from the optical drive for adjusting the first start position and the second data start indicator 204-1 receives a second position shifting signal from the optical drive for adjusting the second start position. The window generator 208 further receives a window sizing signal for adjusting a size of the window interval for searching the data sync pattern of the data therein. The size of the window interval is length of a time period for the data sync pattern search circuit 210 to search the data sync pattern. Worst, a pseudo sync signal may be generated by the data sync pattern search circuit 210 for the optical disc drive to encode the cluster area of the data and prevent an unstable status of the whole optical disc drive if the data sync pattern cannot be found in the window interval. The failure in searching the data sync pattern may cause the optical disc drive to get trapped in a dead loop as the data sync pattern is never to be located in this manner.

Figure 3:
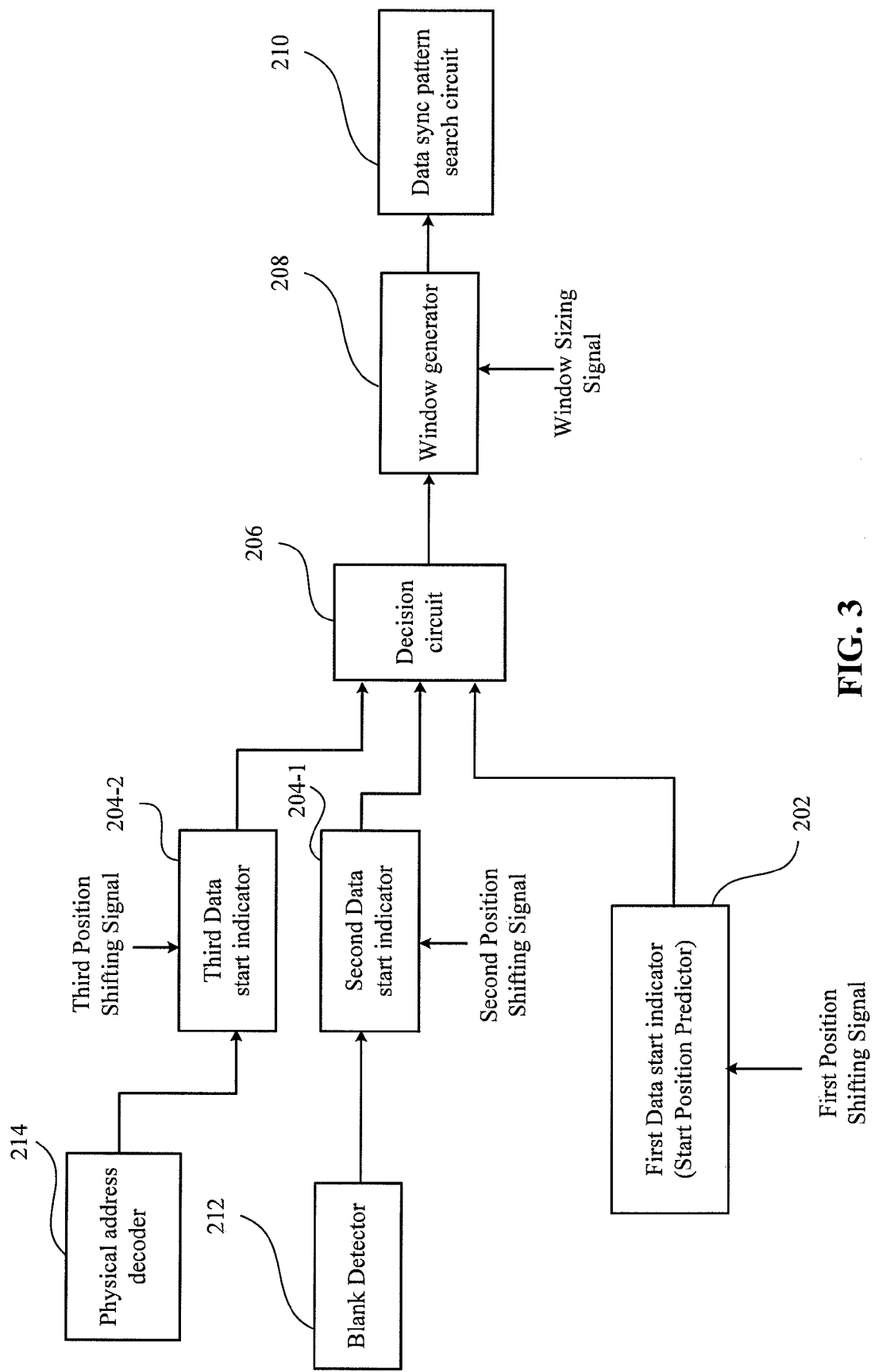
FIG. 3 illustrates a functional block diagram of a data search system for searching the data sync pattern, which starts searching by using a physical address decoder or a blank detector and selectively outputs first, second or third start search signals according to second embodiment of the present invention.

Please refer to FIG. 3 in conjunction with FIG. 1A to FIG. 1C, which illustrates a functional block diagram of a data search system for searching the data sync pattern, which starts searching by using a physical address decoder or a blank detector and selectively outputs first, second and third start search signal according to second embodiment of the present invention. In the second embodiment, the data search system further comprises a third data start indicator 204-2 and a physical address decoder 214 than the first embodiment.

If the data is non-consecutive as shown in FIG. 1B or FIG. 1C, the physical address decoder 214 decodes a physical address signal read from the optical disc to obtain a physical address when the blank detector 212 detects the blank area end to generate a blank signal. The third data start indicator 204-2 generates a third start search signal indicating a third start position when the decoded physical address signal indicates a predetermined physical address. Therefore, the decision circuit 206 outputs a selected start search signal selected from a group of the first start search signal, the second start search signal and the third start search signal.

As similarly as how to select the start search signal described in the first embodiment, but there will be more considerations about how to select the start search signal of the decision circuit 206 cause of the added third start search signal. The start search signal can be the second start search signal but also can be the third start search signal when the blank detector detects a data area of the optical disc in another case as a default setting. In a further case, the selected start search signal may be one of the second start search signal and the third start search signal when the data sync pattern search circuit searches the data sync pattern of the optical disc for the first time as a default setting.

Moreover, the third data start indicator 204-2 receives a third position shifting signal from the optical drive for adjusting the third start position as similarly as the first and second start indicator 204, 204-1.

Figure 4:
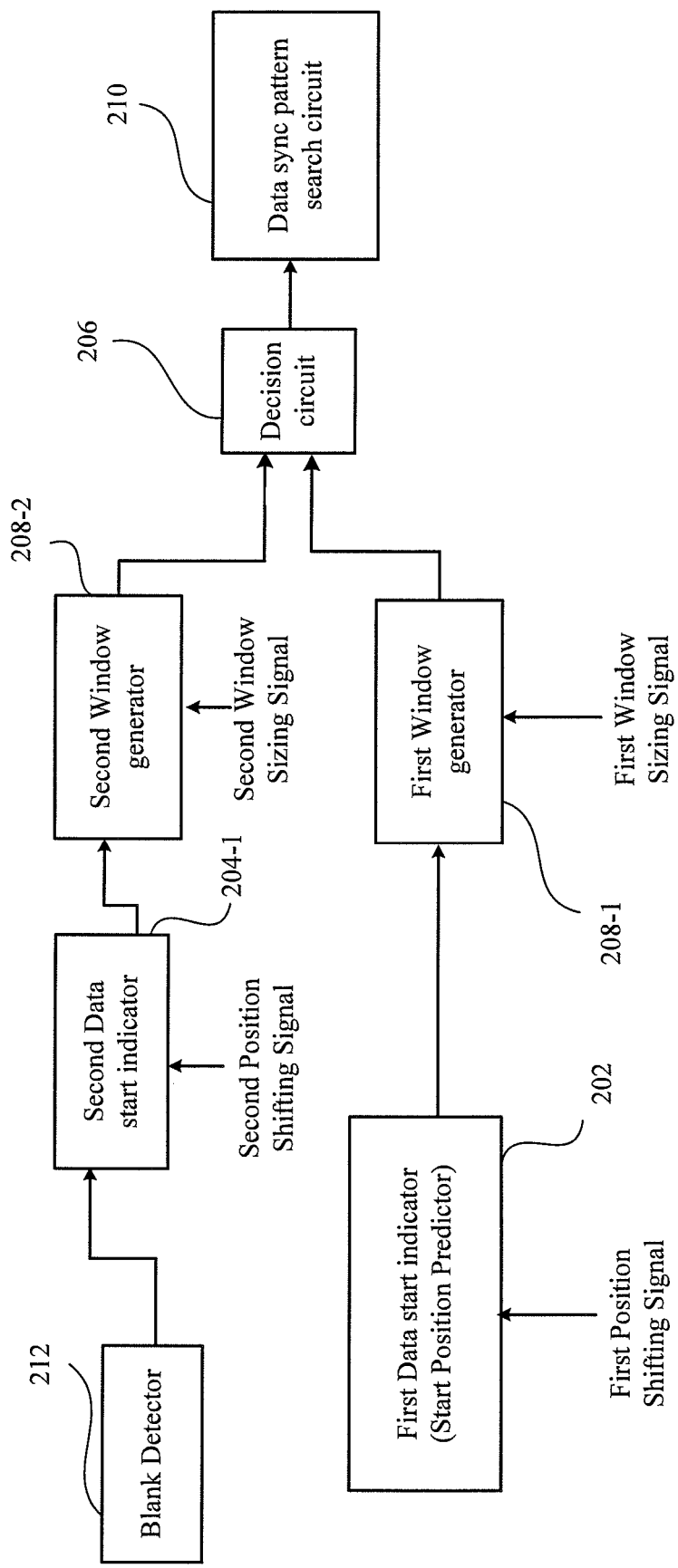
FIG. 4 illustrates a functional block diagram of a data search system, which starts searching by using a blank detector and selectively employs the first or the second window interval according to third embodiment of the present invention.

Please refer to FIG. 4 in conjunction with FIG. 1A to FIG. 1C, which illustrates a functional block diagram of a data search system, which starts searching by using a blank detector and selectively employs the first or the second window interval according to third embodiment of the present invention. In the second embodiment, the data search system comprises the first data start indicator 202, the second data start indicator 204-1, the decision circuit 206, a first window generator 208-1, a second window generator 208-2, the data sync pattern search circuit 210 and the blank detector 212.

The first data start indicator (start position predictor) 202 predicts the beginning of the data to generate the first start search signal indicating the first start position for the first window generator 208-1 to generate a first window interval. The blank detector 212 detects a blank area of the optical disc to generate a blank signal. The second data start indicator 204-2 generates the second start search signal indicating the second start position according to the blank signal. The second window generator 208-2 generates a second window interval from the second start position. The decision circuit 206 selectively employs a selected window interval from the first window interval or the second window interval for the data sync pattern search circuit.

Specifically, there will be more detail considerations about how to employ the selected window interval of the decision circuit 206 but not only about that the data is consecutive or not. As similarly as how to select the start search signal described in the first embodiment, many conditions for the selected window interval are all possible, there can be several predetermined settings for selecting the window interval as described below. The selected window interval can be the second window interval as the blank detector detects a blank area of the optical disc as a default setting. Further, the selected window interval may also be the second window interval when the data sync pattern search circuit searches the data sync pattern of the optical disc for the first time as default setting of the data search system.

Alternatively, The selected window interval can be the first window interval since a first searching of the data sync pattern search circuit for the data sync pattern of the optical disc as another setting. Moreover, the selected window interval also can be the first window interval after reaching predetermined times of searching for the data sync pattern of the optical disc in a different case. The data sync pattern search circuit 210 searches the data sync pattern of the data in the selected window interval to determine the cluster area of the data following the data sync pattern. Moreover, the first data start indicator further receives a first position shifting signal for adjusting the first start position. The second data start indicator further receives a second position shifting signal for adjusting the second start position.

Furthermore, the first window generator further receives a first window sizing signal for adjusting a size of the first window interval according to the first window sizing signal. The second window generator further receives a second window sizing signal for adjusting a size of the second window interval according to the second window sizing signal.

Figure 5:
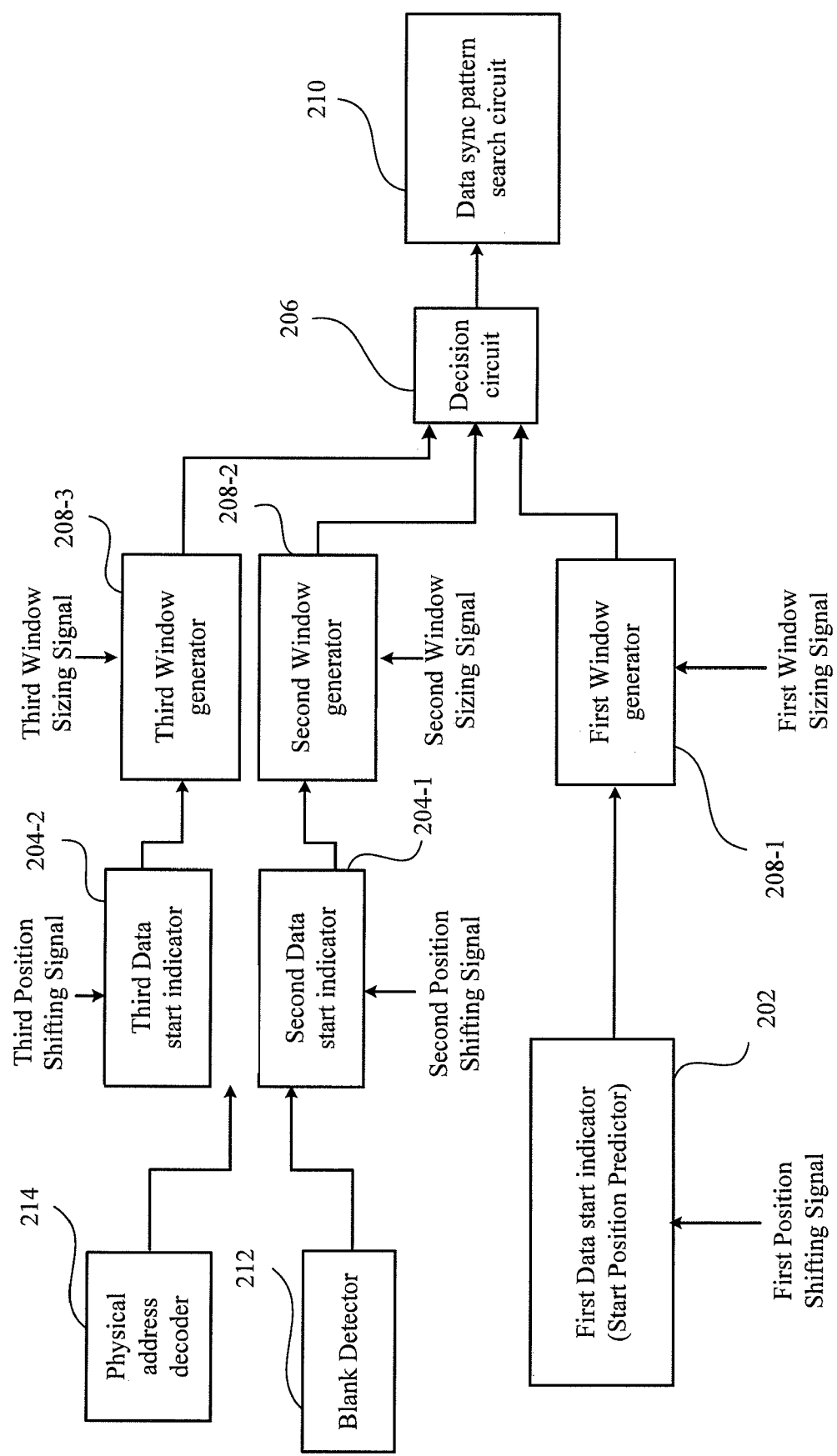
FIG. 5 illustrates a functional block diagram of a data search system, which starts searching by a physical address decoder or a blank detector and selectively employs the first, second or third window intervals according to fourth embodiment of the present invention.

Please refer to FIG. 5 in conjunction with FIG. 1A to FIG. 1C, which illustrates a functional block diagram of a data search system, which mainly starts searching by a physical address decoder or a blank detector and selectively employs the first, second and third window intervals according to fourth embodiment of the present invention. In the fourth embodiment, the data search system further comprises a third data start indicator 204-2, a third window generator 208-3, and the physical address decoder 214 than the third embodiment.

If the data is non-consecutive as shown in FIG. 1B or FIG. 1C, the physical address decoder 214 decodes a physical address signal read from the optical disc to obtain a physical address when the blank detector 212 detects the blank area end to generate a blank signal. The third data start indicator 204-2 generates a third start search signal indicating a third start position when the decoded physical address signal indicates a predetermined physical address. The predetermined physical address position can be a beginning of the reference area or a beginning of the first data area of an optical disc. The third window generator 208-2 generates a third window interval from the second start position. The third window generator 208-3 generates a third window interval from the third start position. Therefore, the decision circuit 206 selectively employs a selected window interval from a group of the first window interval, the second window interval and the third window interval for the data sync pattern search circuit.

As similarly as how to employs a selected window interval described in the third embodiment, but there will be more considerations about how to select the start search signal of the decision circuit 206 cause of the added third window interval. The selected window interval can be the second window interval but also can be the third window interval as the blank detector detects a data area of the optical disc in another case. In a further case, the selected window interval may also be one of the second window interval and the third window interval when the data sync pattern search circuit searches the data sync pattern of the optical disc for the first time as default setting.

Moreover, the third data start indicator 204-2 receives a third position shifting signal from the optical drive for adjusting the third start position as similarly as the first and second start indicator 204, 204-1. The third window generator 208-3 further receives a third window sizing signal for adjusting a size of the third window interval according to the third window sizing signal.

No matter in which one of the embodiments, the first data start indicator 202 comprises a counter. The counter can count number of sectors (smallest unit of the data) from a start position to an end position (the interval of the RUB) of the preceding data to predict the beginning position of the current data or just count sectors of a predetermined data length from the preceding data sync pattern to predict the beginning position of the current data. Therefore, in the first and second embodiment, the selected start search signal can be the first start search signal since a first counting of the counter from the start position to the end position of the preceding data as a default setting of the data search system or after several countings the sectors of the predetermined data length as another setting.

Similarly, in the third and fourth embodiment, the selected window interval can be the first window interval since a first counting of the counter from the start position to the end position of the preceding data as a default setting of the data search system or after several times of counting the sectors of the predetermined data length as another setting of the data search system. The predetermined physical address position can be the beginning of the reference area or the beginning of the first data unit. Knowing the physical address corresponding to the data, the third data start indicator 204-2 detects a Run-in area defined prior to the data sync pattern to inform the optical disc drive to prepare for searching the coming predetermined physical address position.

Significantly, although the Blu-Ray and HD-DVD discs are illustrated here but not a restriction to the present invention. The data search system for searching the data sync pattern according to the present invention also can be employed to the discs such as CD, DVD or other discs.

With such variable and flexible data searching system according to the present invention, a low failure rate of searching the data in a non-consecutively recorded data or even a consecutively recorded data can be obtained more quickly and correctly.

Figure 6:
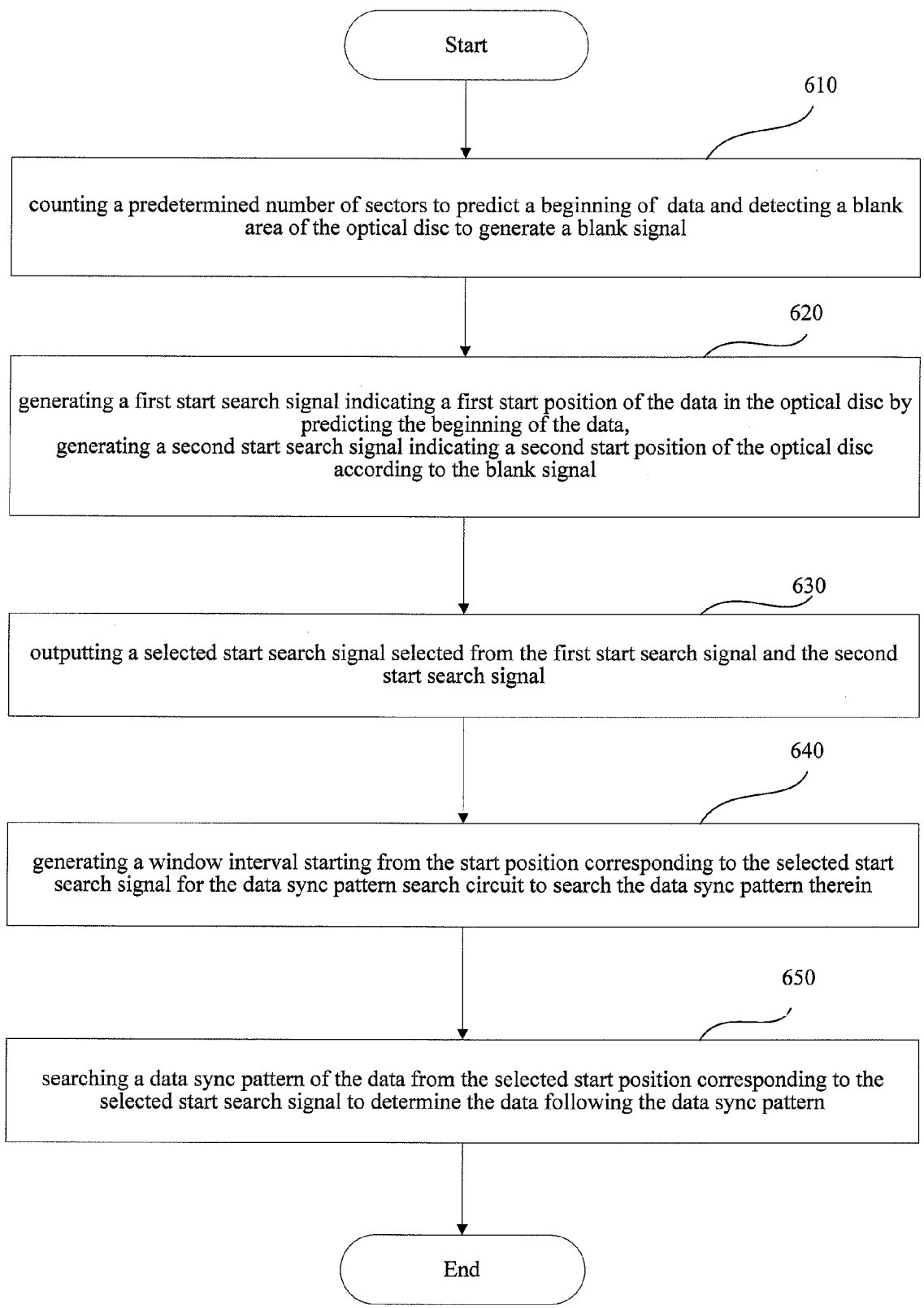
FIG. 6 shows a flow chart of the method for searching the data sync pattern in an optical disc according to first embodiment of the present invention.

FIG. 6 shows a flow chart of the method for searching the data sync pattern in an optical disc according to the first embodiment of the present invention.

The method of searching a data according to the first embodiment comprises the steps below:

In step 610, counting a predetermined number of sectors to predict a beginning of data and detecting a blank area of the optical disc to generate a blank signal;

In step 620, generating a first start search signal indicating a first start position of the data in the optical disc by predicting the beginning of the data, generating a second start search signal indicating a second start position of the optical disc according to the blank signal;

In step 630, outputting a selected start search signal selected from the first start search signal and the second start search signal; and In step 450, searching a data sync pattern of the data from the selected start position corresponding to the selected start search signal to determine the data following the data sync pattern.

The method may further comprises a step 640, generating a window interval starting from the start position corresponding to the selected start search signal for the data sync pattern search circuit to search the data sync pattern therein before the step 650.

Figure 7:
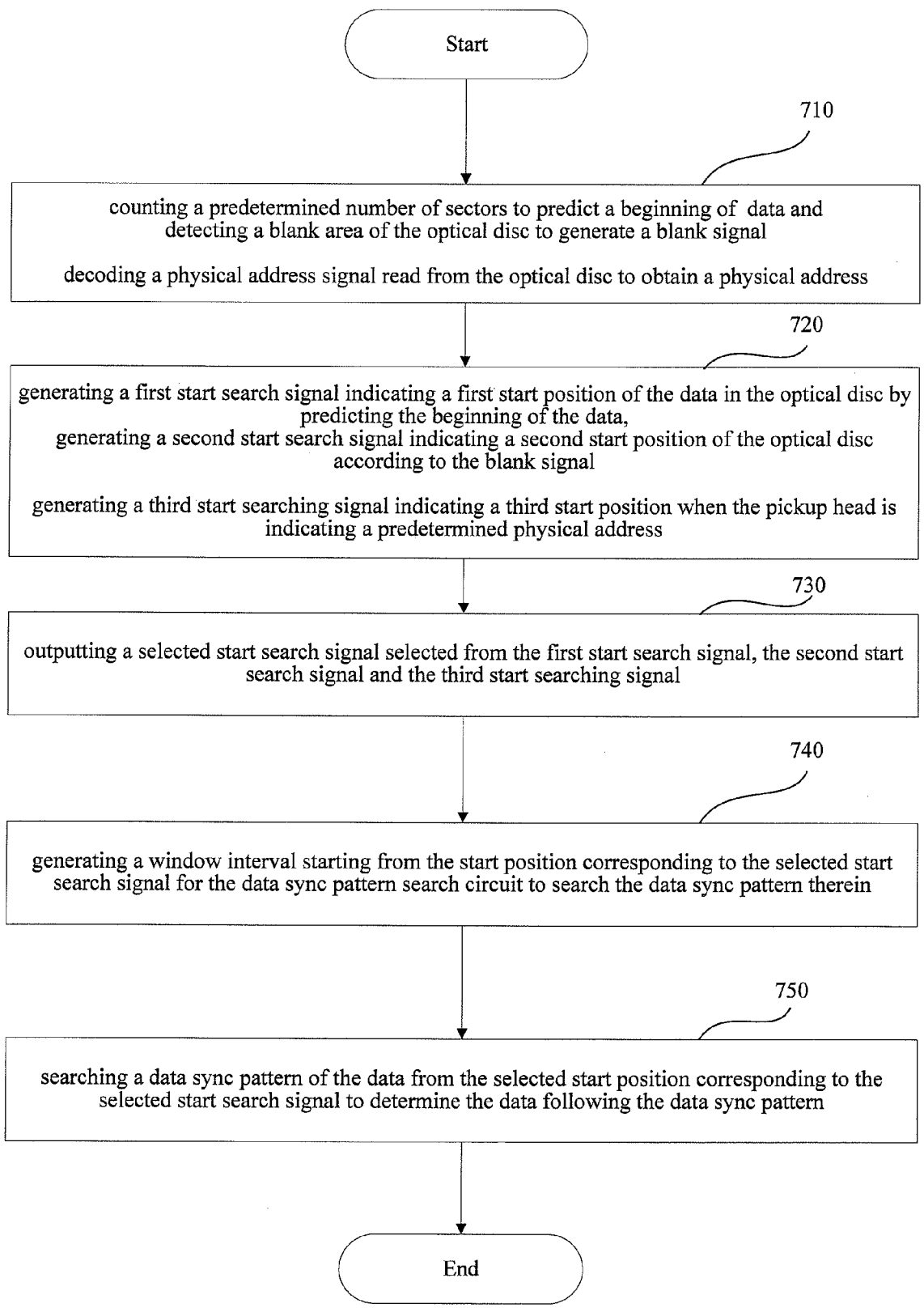
FIG. 7 shows a flow chart of the method for searching the data sync pattern in an optical disc according to second embodiment of the present invention.

FIG. 7 shows a flow chart of the method for searching the data sync pattern in an optical disc according to the second embodiment of the present invention.

The method of searching a data according to the second embodiment comprises the steps below:

In step 710, counting a predetermined number of sectors to predict a beginning of data and detecting a blank area of the optical disc to generate a blank signal, meanwhile decoding a physical address signal read from the optical disc to obtain a physical address;

In step 720, generating a first start search signal indicating a first start position of the data in the optical disc by predicting the beginning of the data, generating a second start search signal indicating a second start position of the optical disc according to the blank signal and generating a third start searching signal indicating a third start position when the pickup head is indicating a predetermined physical address;

In step 730, outputting a selected start search signal selected from a group of the first start search signal, the second start search signal and the third start searching signal; and In step 750, searching a data sync pattern of the data from the selected start position corresponding to the selected start search signal to determine the data following the data sync pattern.

The method may further comprises a step 740, generating a window interval starting from the start position corresponding to the selected start search signal for the data sync pattern search circuit to search the data sync pattern therein before the step 750.

Figure 8:
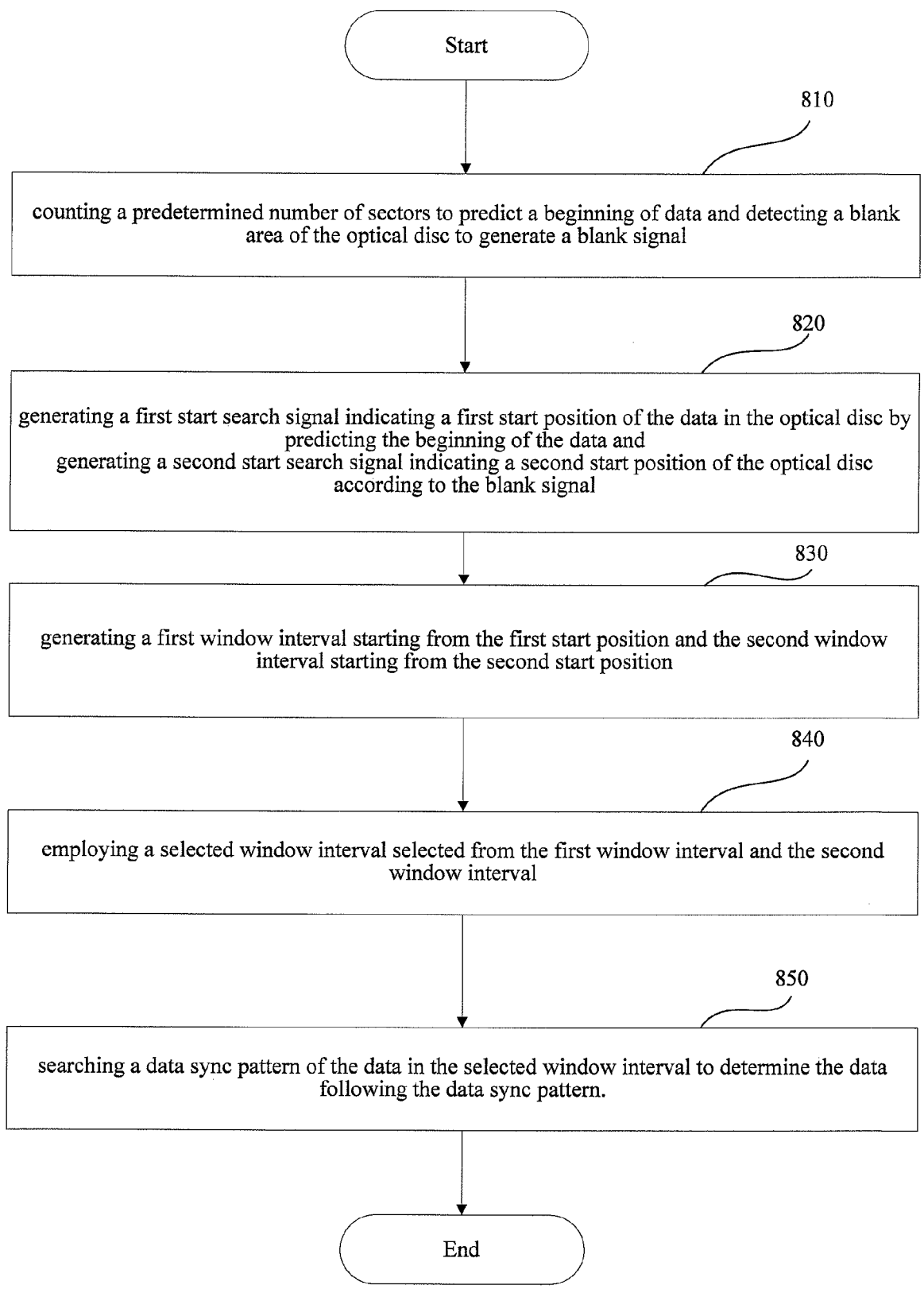
FIG. 8 shows a flow chart of the method for searching the data sync pattern in an optical disc according to third embodiment of the present invention.

FIG. 8 shows a flow chart of the method for searching the data sync pattern in an optical disc according to the third embodiment of the present invention.

The method of searching a data according to the fourth embodiment comprises the steps below:

In step 810, counting a predetermined number of sectors to predict a beginning of data and detecting a blank area of the optical disc to generate a blank signal;

In step 820, generating a first start search signal indicating a first start position of the data in the optical disc by predicting the beginning of the data and generating a second start search signal indicating a second start position of the optical disc according to the blank signal;

In step 830, generating a first window interval starting from the first start position and a second window interval starting from the second start position;

In step 840, employing a selected window interval selected from the first window interval and the second window interval; and In step 850, searching a data sync pattern of the data in the selected window interval to determine the data following the data sync pattern.

Figure 9:
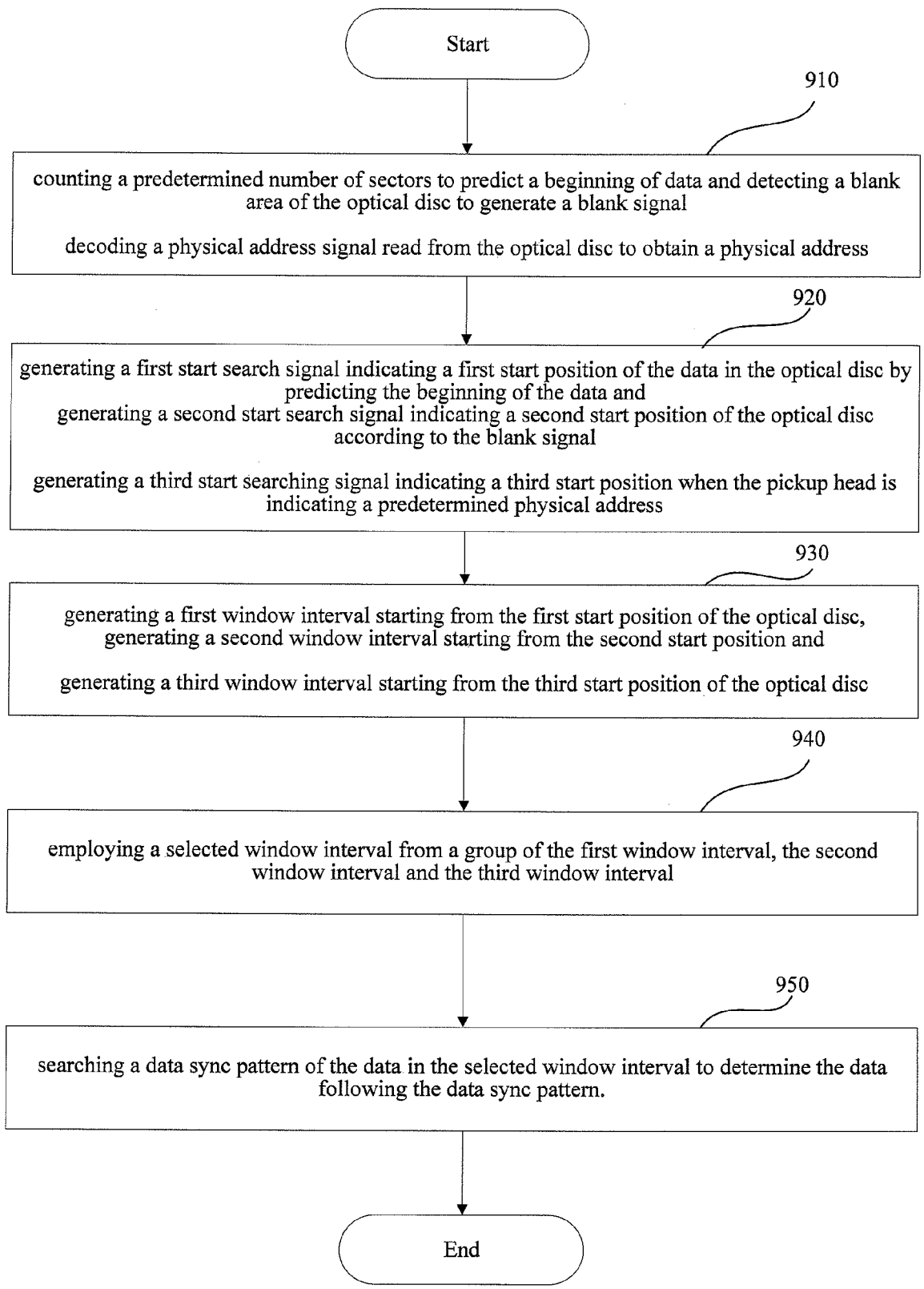
FIG. 9 shows a flow chart of the method for searching the data sync pattern in an optical disc according to fourth embodiment of the present invention.

FIG. 9 shows a flow chart of the method for searching the data sync pattern in an optical disc according to the fourth embodiment of the present invention.

The method of searching a data according to the fourth embodiment comprises the steps below:

In step 910, counting a predetermined number of sectors to predict a beginning of data and detecting a blank area of the optical disc to generate a blank signal, meanwhile decoding a physical address signal read from the optical disc to obtain a physical address;

In step 920, generating a first start search signal indicating a first start position of the data in the optical disc by predicting the beginning of the data, generating a second start search signal indicating a second start position of the optical disc according to the blank signal and generating a third start searching signal indicating a third start position when the pickup head is indicating a predetermined physical address;

In step 930, generating a first window interval starting from the first start position, a second window interval starting from the second start position and a third window interval starting from the third start position;

In step 940, employing a selected window interval selected from a group of the first window interval, the second window interval and the third window interval to be employed for the data sync pattern search circuit; and In step 950, searching a data sync pattern of the data in the selected window interval to determine the data following the data sync pattern.

By detecting the blank area prior to the data or with reference to the predetermined physical address, the second start search signal and the third start search signal can be obtained. When a blank area exists (a non-consecutive data), the decision circuit selects the second start search signal or the third start search signal. When the data is consecutively recorded, the decision circuit may select the first start search signal from the first data start indicator. The present invention provides a data search system capable of searching a non-consecutive data in the optical disc more quickly and correctly. A low failure rate of searching the data sync pattern in a non-consecutively recorded data or even a consecutively recorded data can be obtained more quickly and correctly.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A data search system for searching a data sync pattern in an optical disc, the system comprising:
    a first data start indicator, generating a first start search signal indicating a first start position of the data in the optical disc by counting a predetermined amount of preceding data to predict a beginning of data;
    a blank detector, detecting a blank area of the optical disc to generate a blank signal;
    a second data start indicator, generating a second start search signal indicating a second start position according to the blank signal;
    a decision circuit, outputting a selected start search signal selected from the first start search signal and the second start search signal; and
    a data sync pattern search circuit, searching the data sync pattern of the data from the selected start position corresponding to the selected start search signal.

2. The system of claim 1, further comprising a physical address decoder, decoding a physical address signal read from the optical disc to obtain a decoded physical address signal and a third data start indicator, generating a third start search signal indicating a third start position when the decoded physical address signal indicates a predetermined physical address.

3. The system of claim 2, wherein the decision circuit outputs a selected start search signal selected from a group of the first start search signal, the second start search signal and the third start search signal.

4. The system of claim 3, further comprising a window generator, generating a window interval starting from the start position corresponding to the selected start search signal for the data sync pattern search circuit to search the data sync pattern therein.

5. The system of claim 4, wherein the window generator further receives a window sizing signal for adjusting a size of the window interval according to the window sizing signal.

6. The system of claim 4, wherein the size of the window interval is length of a time period.

7. The system of claim 3, wherein the selected start search signal is the second start search signal as the blank detector detects a blank area of the optical disc.

8. The system of claim 3, wherein the selected start search signal is the third start search signal as the blank detector detects a data area of the optical disc.

9. The system of claim 3, wherein the selected start search signal is one of the second start search signal and the third start search signal when the data sync pattern search circuit searches the data sync pattern of the optical disc for the first time.

10. The system of claim 3, wherein the selected start search signal is the first start search signal from a second time of searching for the data sync pattern of the optical disc.

11. The system of claim 3, wherein the selected start search signal is the first start search signal after reaching predetermined times of searching for the data sync pattern of the optical disc.

12. The system of claim 1, wherein the data sync pattern search circuit searches the data sync pattern to determine the data following the data sync pattern.

13. The system of claim 1, wherein the first data start indicator further receives a first position shifting signal for adjusting the first start position and the second data start indicator further receives a second position shifting signal for adjusting the second start position.

14. The system of claim 2, wherein the third data start indicator further receives a third position shifting signal for adjusting the third start position.

15. The system of claim 1, wherein the predetermined amount of preceding data to predict the beginning of the data is the amount of preceding data from a start position to an end position of a preceding data to predict the beginning of the data.

16. The system of claim 15, wherein the selected start search signal is the first start search signal since a first counting of the counter from the start position to the end position of the preceding data.

17. The system of claim 1, wherein the predetermined amount of preceding data to predict the beginning of the data is the amount of preceding data of a predetermined data length from a preceding data sync pattern to predict the beginning of the data.

18. The system of claim 17, wherein the selected start search signal is the first start search signal after several times of counting the predetermined data length.

19. A data search system for searching a data sync pattern in an optical disc, the system comprising:
    a first data start indicator, generating a first start search signal indicating a first start position of the data in the optical disc by counting a predetermined amount of preceding data to predict a beginning of data;
    a blank detector, detecting a blank area of the optical disc to generate a blank signal;
    a second data start indicator, generating a second start search signal indicating a third start position according to the blank signal;
    a first window generator, generating a first window interval starting from the first start position;
    a second window generator, generating a second window interval starting from the second start position;
    a decision circuit, employing a selected window interval from the first window interval and the second window interval for the data sync pattern search circuit; and
    a data sync pattern search circuit, searching the data sync pattern of the data in the selected window interval to search the data sync pattern therein.

20. The system of claim 19, further comprising a physical address decoder for decoding a physical address signal read from the optical disc to obtain a decoded physical address signal, a third data start indicator for generating a third start search signal indicating a third start position when the decoded physical address signal indicates a predetermined physical address and a third window generator for generating a third window interval starting from the third start position.

21. The system of claim 20, the decision circuit employs a selected window interval from a group of the first window interval, the second window interval and the third window interval for the data sync pattern search circuit.

22. The system of claim 21, wherein the selected window interval is the second window interval as the blank detector detects a blank area of the optical disc.

23. The system of claim 21, wherein the selected window interval is the third window interval as the blank detector detects a data area of the optical disc.

24. The system of claim 21, wherein the selected window interval is one of the second window interval and the third window interval when the data sync pattern search circuit searches the data sync pattern of the optical disc for the first time.

25. The system of claim 21, wherein the selected window interval is the first window interval from a second searching of the data sync pattern search circuit for the data sync pattern of the optical disc.

26. The system of claim 21, wherein the selected window interval is the first window interval after reaching predetermined times of searching for the data sync pattern of the optical disc.

27. The system of claim 21, wherein the selected window interval is the first window interval since a first counting of the counter from a start position to an end position of a preceding data.

28. The system of claim 21, wherein the selected window interval is the first window interval after several times of counting sectors of a predetermined data length from a preceding data sync pattern to predict the beginning of the data.

29. A method for searching a data sync pattern in an optical disc, the method comprising the steps of:
- counting a predetermined amount of preceding data to predict a beginning of data and detecting a blank area of the optical disc to generate a blank signal;
- generating a first start search signal indicating a first start position of the data in the optical disc by predicting the beginning of the data, generating a second start search signal indicating a second start position of the optical disc according to the blank signal;
- outputting a selected start search signal selected from the first start search signal and the second start search signal; and
- searching the data sync pattern of the data from the selected start position corresponding to the selected start search signal to determine the data following the data sync pattern.

30. The method of claim 29, further comprising steps of decoding a physical address signal read from the optical disc to obtain a physical address and generating a third start searching signal indicating a third start position when the pickup head is indicating a predetermined physical address.

31. The method of claim 30, wherein the selected start search signal is selected from a group of the first start search signal, the second start search signal and the third start searching signal.

32. The method of claim 31, further comprising a step of generating a window interval starting from the start position corresponding to the selected start search signal for the data sync pattern search circuit to search the data sync pattern therein before the step of searching the data sync pattern.

33. The method of claim 29, further comprising steps of receiving a first position shifting signal for adjusting the first start position and receiving a second position shifting signal for adjusting the second start position before the step of generating the first start search signal.

34. The method of claim 30, further comprising a step of receiving a third position shifting signal for adjusting the third start position before the step of generating the third start search signal.

35. The method of claim 29, wherein the step of counting the predetermined amount of preceding data is to count from a start position to an end position of a preceding data for predicting the beginning of the data.

36. The method of claim 29, wherein the step of counting the predetermined amount of preceding data is to count sectors of a predetermined data length from a preceding data sync pattern for predicting the beginning of the data.

37. A method for searching a data sync pattern in an optical disc, the method comprising the steps of:
- counting a predetermined amount of preceding data to predict a beginning of data and detecting a blank area of the optical disc to generate a blank signal;
- generating a first start search signal indicating a first start position of the data in the optical disc by predicting the beginning of the data and generating a second start search signal indicating a second start position of the optical disc according to the blank signal;
- generating a first window interval starting from the first start position and a second window interval starting from the second start position;
- employing a selected window interval selected from the first window interval and the second window interval; and
- searching the data sync pattern of the data in the selected window interval to determine the data following the data sync pattern.

38. The method of claim 37, further comprising steps of decoding a physical address signal read from the optical disc to obtain a physical address, generating a third start searching signal indicating a third start position when the pickup head is indicating a predetermined physical address and generating a third window interval starting from the third start position.

39. The method of claim 38, wherein the selected window interval is selected from a group of the first window interval, the second window interval and the third window interval.

* * * * *